United States Patent
Tomoda et al.

(10) Patent No.: US 10,366,075 B2
(45) Date of Patent: Jul. 30, 2019

(54) DATABASE MANAGEMENT SYSTEM AND METHOD

(71) Applicant: Hitachi, Ltd., Tokyo (JP)

(72) Inventors: Atsushi Tomoda, Tokyo (JP); Yuuya Isoda, Tokyo (JP); Kazutomo Ushijima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 849 days.

(21) Appl. No.: 14/894,042

(22) PCT Filed: Jan. 22, 2014

(86) PCT No.: PCT/JP2014/051263
§ 371 (c)(1),
(2) Date: Nov. 25, 2015

(87) PCT Pub. No.: WO2015/111152
PCT Pub. Date: Jul. 30, 2015

(65) Prior Publication Data
US 2016/0125018 A1    May 5, 2016

(51) Int. Cl.
*G06F 16/00* (2019.01)
*G06F 16/23* (2019.01)
*G06F 16/18* (2019.01)
*G06F 16/2455* (2019.01)

(52) U.S. Cl.
CPC ...... *G06F 16/2365* (2019.01); *G06F 16/1805* (2019.01); *G06F 16/2358* (2019.01); *G06F 16/2455* (2019.01)

(58) Field of Classification Search
CPC ......... G06F 17/30371; G06F 17/30185; G06F 17/30368; G06F 17/30477; G06F 16/2365; G06F 16/2455; G06F 16/1805

USPC .......................................................... 707/703
See application file for complete search history.

(56) References Cited

U.S. PATENT DOCUMENTS

| | | | | |
|---|---|---|---|---|
| 5,878,414 A | * | 3/1999 | Hsiao | G06F 17/30368 707/648 |
| 6,366,915 B1 | * | 4/2002 | Rubert | G06F 17/30545 707/770 |
| 7,062,629 B2 | * | 6/2006 | Shimada | G06F 3/0605 707/E17.01 |
| 8,964,849 B2 | * | 2/2015 | Nguyen | H04N 19/70 375/240.18 |

(Continued)

FOREIGN PATENT DOCUMENTS

| JP | 01-246645 A | 10/1989 |
|---|---|---|
| JP | 2001-229063 A | 8/2001 |

(Continued)

OTHER PUBLICATIONS

International Search Report of PCT/JP2014/051263.
Japanese Office Action received in corresponding Japanese Application No. 2015-558634 dated Dec. 20, 2016.

*Primary Examiner* — Monica M Pyo
(74) *Attorney, Agent, or Firm* — Mattingly & Malur, PC

(57) ABSTRACT

A database management system generates a log each transaction during execution of a plurality of transactions and stores the generated logs in log storage areas. The database management system records sequence numbers of logs at least in the generated logs of transactions belonging to a set of transactions of which results are different depending on a transaction execution order.

18 Claims, 13 Drawing Sheets

(56) References Cited

U.S. PATENT DOCUMENTS

| | | | | |
|---|---|---|---|---|
| 2005/0210073 A1* | 9/2005 | Oeda | ................... | G06F 11/1471 |
| 2009/0019057 A1* | 1/2009 | Hayashi | .............. | G06F 17/3087 |
| 2010/0274758 A1* | 10/2010 | Tahara | ................ | G06F 11/2028 |
| | | | | 707/618 |

FOREIGN PATENT DOCUMENTS

| | | |
|---|---|---|
| JP | 2001-249903 A | 9/2001 |
| JP | 2012-069031 A | 4/2012 |

\* cited by examiner

Tr.A: update val=val-10 where ID=X;
update val=val+10 where ID=Y;
commit;

Tr.B: update val =val+10 where ID=X;
commit;

Tr.C: update val=val+10
where ID=Y and val>100;
commit;

Tr.D: update val=val*1.1 where ID=Y;
commit;

Tr.E: update val=val+10 where ID=X;
update val=val-10 where ID=Y;
commit;

Comparative Example 2

DATABASE MANAGEMENT SYSTEM AND METHOD

TECHNICAL FIELD

This invention generally relates to database management and to, for example, the output of the logs of transaction processes.

BACKGROUND ART

As a database management system (hereinafter referred to as DBMS), an on-disk database in which databases (particularly, main data such as tables and indexes) are arranged in a nonvolatile storage apparatus (typically, a disk storage apparatus such as a hard disk drive (HDD)) and an in-memory database in which databases are arranged in a main memory (generally, a volatile memory) are known (a hybrid DBMS in which an on-disk database and an in-memory database are combined is also known).

In the in-memory database, in order to recover the state of databases on the main memory, it is necessary to output the logs including the update history in a nonvolatile storage apparatus.

In general, logs are output to a single log file during execution of transactions. Even when transactions are processed in parallel in a plurality of cores (or a plurality of central processing units (CPUs)), the output destination of logs is a single log file. Thus, the log output causes a bottleneck.

However, it is not always necessary to determine the order of all transactions. For example, when a set of data referenced or updated by two transactions does not have a common portion, even if an execution order of the two transactions is changed, an operation result on a database does not change. Thus, it is not necessary to determine the order of two transactions. In PTL 1, a log file is prepared for each of distributed databases, and a log including the update history of a database is output to a log file corresponding to the database among a plurality of log files.

CITATION LIST

Patent Literature

[PTL 1] U.S. Pat. No. 5,878,414

SUMMARY OF INVENTION

Technical Problem

An in-memory database can divide a database into a plurality of partitions and can manage the respective partitions. When the technique disclosed in PTL 1 is applied to an in-memory database, a log file can be prepared for each partition managed by the in-memory database and a log including the update history of a partition can be output to a log file corresponding to the partition.

However, when the technique of PTL 1 is simply applied to the in-memory database, a number of I/O requests that is several times the number of transactions occur in a storage apparatus. This is because partitions are already defined and it is inevitable that a plurality of partitions of data is referenced and updated during processing of transactions. In this case, even when only one transaction is processed, logs need to be output to a plurality of log files respectively corresponding to the plurality of partitions.

Such a problem is not limited to the in-memory database but may occur in other DBMSs that manage divided databases or other DBMSs that manage a single database.

Solution to Problem

A DBMS generates a log for each transaction during execution of a plurality of transactions and stores the generated logs in log storage areas. The DBMS records sequence numbers of logs at least in the generated logs of transactions belonging to a set of transactions of which results are different depending on an execution order of the transaction.

Advantageous Effects of Invention

The sequence numbers of logs are recorded in logs generated for transactions belonging to a set of transactions of which results of which are different depending on a transaction execution order. Thus, it is possible to specify the transaction execution order for the set of transactions of which results are different depending on the transaction execution order. Thus, even when the number of logs generated for one transaction that has updated two or more database portions among a plurality of database portions obtained by dividing the database is smaller than the number of updated database portions, it is possible to specify the transaction execution order (for example, the partial order) based on the stored logs.

DESCRIPTION OF EMBODIMENTS

Figure 1:
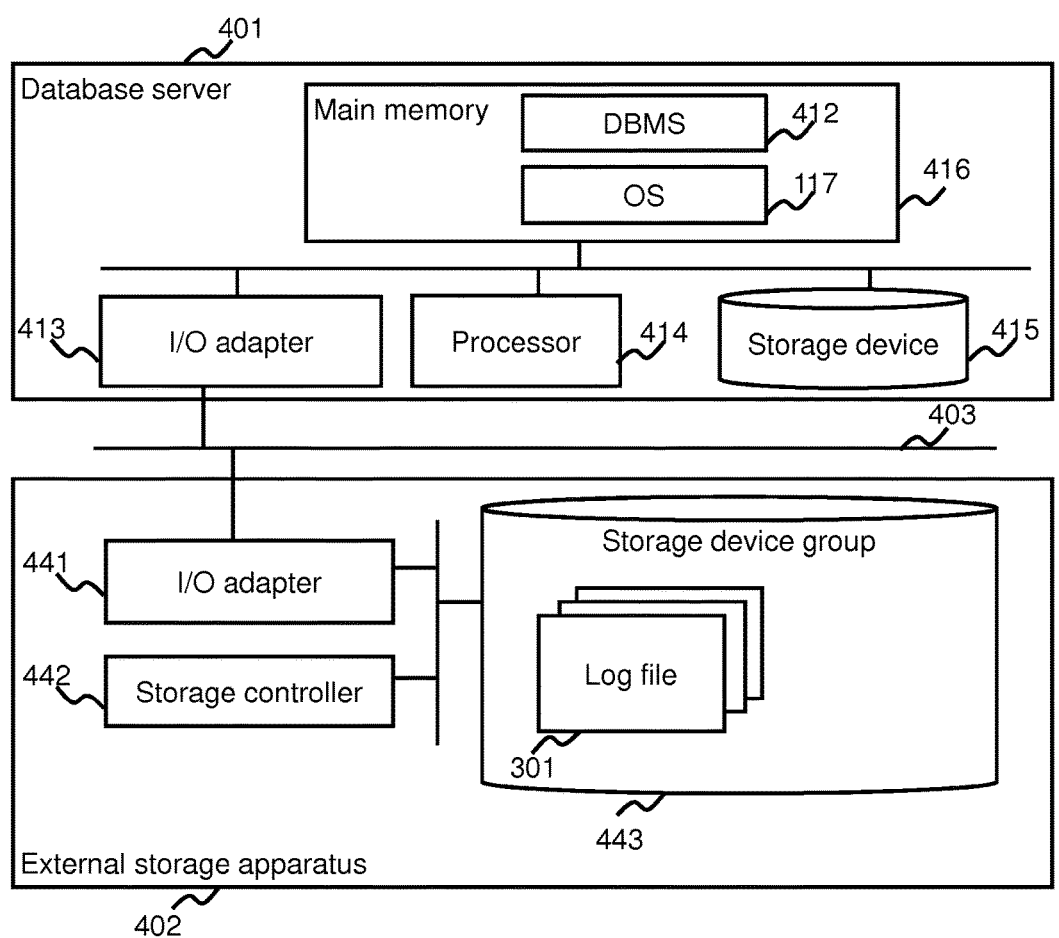
FIG. 1 illustrates a configuration of a computer system according to an embodiment.

Hereinafter, an embodiment will be described with reference to the drawings.

In the following description, reference numerals of the same type of elements include the same parent number. When the same type of elements are distinguished, the reference numerals of elements may be used (for example, partitions 111A, 111B, . . . ). When the same type of elements are not distinguished, only the parent number among the reference numerals of elements may be used (for example, a partition 111).

In the following description, there may be cases where a process is described using a "program" as the subject. However, since a given process is performed while using a storage resource (for example, a memory) and/or a communication interface device or the like as necessary when a program is executed by a processor, the processor may also be used as the subject of the process. A process described using the program as the subject may be a process performed by the processor or a device (for example, a database server) having the processor. Moreover, a processor may include a hardware circuit that performs a part or all of the processes. A program may be installed in respective controllers from a program source. The program source may be a program distribution computer or a storage medium, for example.

FIG. 1 illustrates a configuration of a computer system according to the embodiment.

An external storage apparatus 402 is coupled to a database server 401 via a communication network 403, for example.

The database server 401 is a computer and may be a personal computer, a workstation, or a mainframe or may be a virtual computer configured by a virtualization program in these computers. The database server 401 includes an I/O adapter 413, a main memory 416, a storage device 415, and a processor 414 coupled to these components. The processor 414 may be a module that includes a microprocessor or includes a microprocessor and a dedicated hardware circuit, for example. The processor 414 executes a computer program. The computer program executed by the processor 414 is an operating system (OS) 117 and a database management system (DBMS) 412, for example. The main memory 416 is a volatile dynamic random access memory (DRAM), for example, and temporarily stores a program executed by the processor 414 and data used by the program. The storage device 415 is nonvolatile and is a hard disk drive (HDD) or a solid state drive (SSD), for example. The storage device 415 may store a program and data used by the program. The I/O adapter 413 couples the communication network 403 and the database server 401.

The external storage apparatus 402 is an apparatus having a storage device group 451 including a plurality of storage devices and may be a disk array apparatus, for example, and instead of this, may be a single storage device. The external storage apparatus 402 stores a log file 301. The external storage apparatus 402 receives an I/O request for logs from the database server 401, reads/writes data (for example, logs) according to the I/O request, and returns the read/write result to the database server 401. The storage device included in the storage device group 451 is a device having a nonvolatile storage medium and is a HDD or a SSD, for example. The storage device group 451 may be a redundant array of independent disks (RAID) group and may store data in a predetermined RAID level. A logical storage device (for example, a logical unit, a logical volume, a file system volume) based on a storage space of the storage device group 451 may be provided to the database server 401 and the log file 301 may be stored in the logical storage device. In the present embodiment, the log file 301 is an example of a log storage area.

The external storage apparatus 402 includes an I/O adapter 441 in addition to the storage device group 451 and a storage controller 442 coupled to these components. The I/O adapter 441 couples the external storage apparatus 402 to the communication network 403 via which the I/O adapter 441 is coupled to the database server 401. Examples of the communication protocol employed in the communication network 403 include a fiber channel (FC), a small computer system interface (SCSI), and a transmission control protocol/Internet protocol (TCP/IP). For example, when the fiber channel or the SCSI is employed, the I/O adapter 441 (and 413) is often referred to as a host bus adapter. The storage controller 442 includes a memory and a processor, for example, and reads or writes data from or to the storage device group 451 that stores the log file 301 according to an I/O request from the database server 401.

Figure 2:
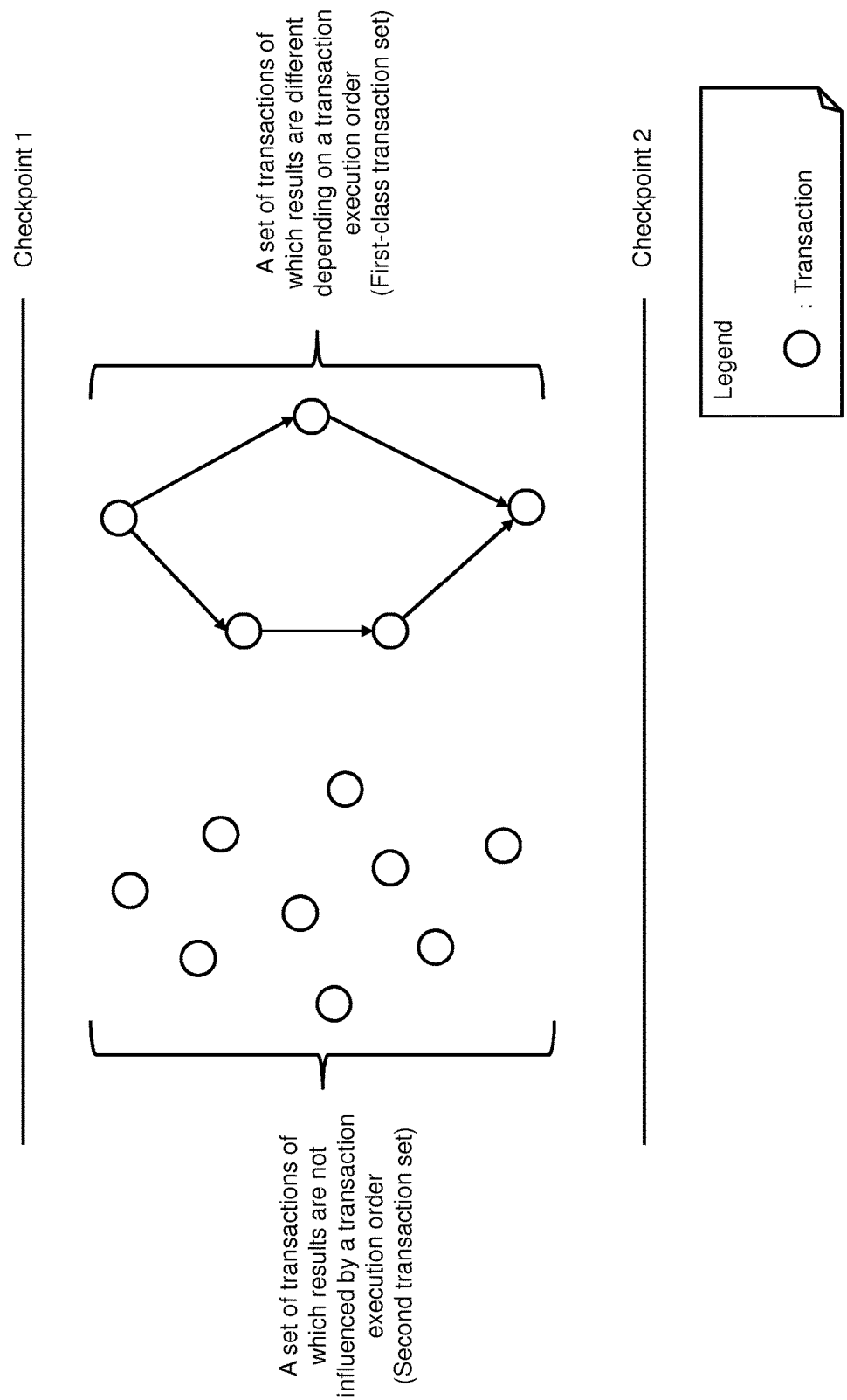
FIG. 2 illustrates an example of a transaction set.

FIG. 2 illustrates an example of a transaction set.

This diagram illustrates an example of transactions executed between two checkpoints 1 and 2. The transactions executed in the present embodiment are classified into any one of a first-class transaction set and a second-class transaction set.

The first-class transaction set is a set of transactions of which results change depending on a transaction execution order. In the illustrated example, a partial order is defined. According to the partial order, although a plurality of transactions that updates the same record has to be executed in a defined order, a plurality of transactions that update different records may be executed in an arbitrary order.

The second-class transaction set is a set of transactions of which results are not influenced by a transaction execution order.

Whether an execution target transaction belongs to the first-class transaction set or the second-class transaction set can be determined according to one or a plurality of query execution plans, for example.

Figure 3:
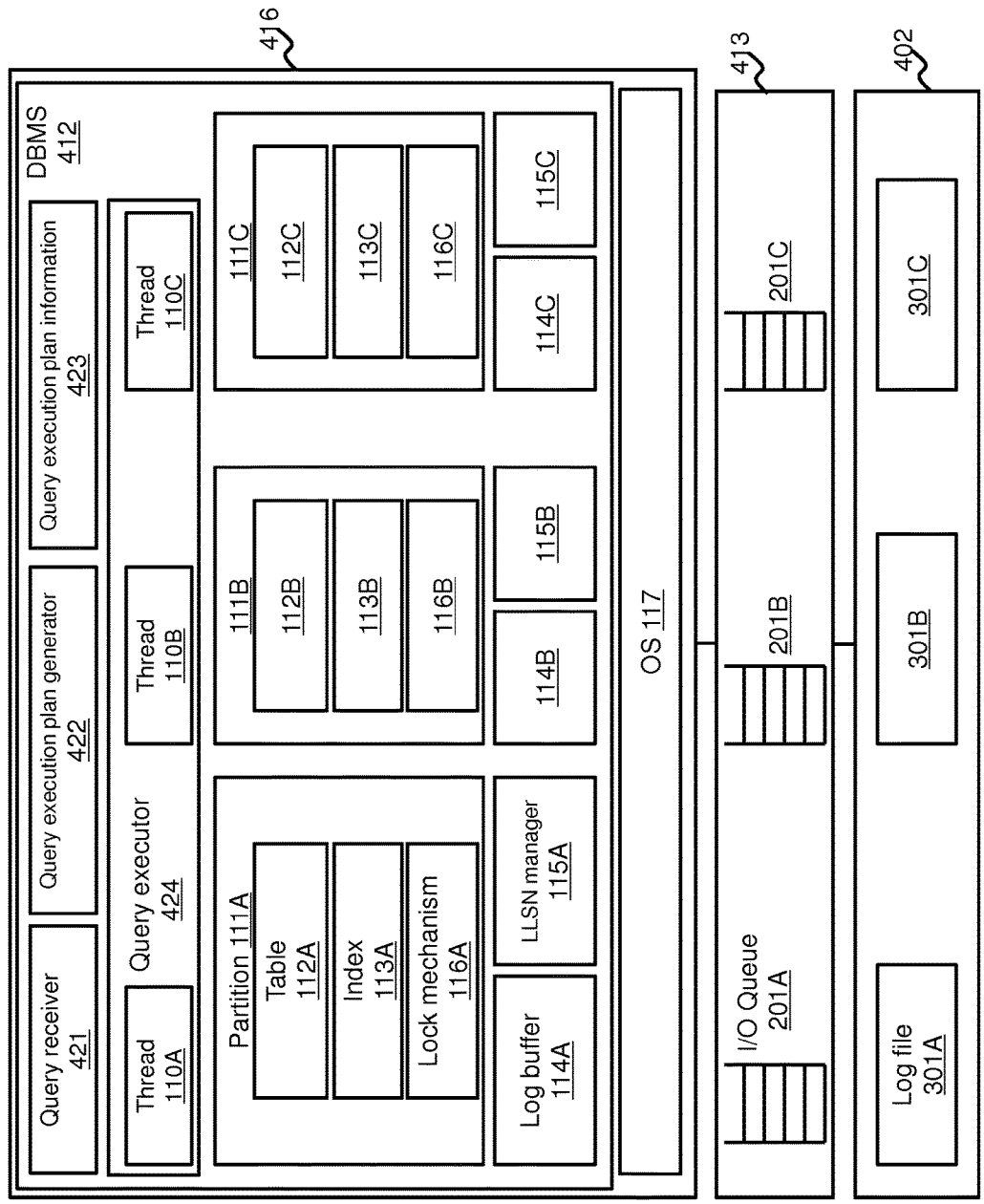
FIG. 3 is a functional block diagram of a computer system according to an embodiment.

FIG. 3 is a functional block diagram of a computer system according to the embodiment.

The DBMS 412 is an in-memory database. The DBMS 412 divides a database into a plurality of partitions 111 (for example, three partitions 111A to 111C) and arranges the partitions on the main memory 416. Each partition 111 includes a portion of the database (for example, a table 112 which is a portion of tables in the database and an index 113 which is a portion of indexes in the database). In one partition 111 (for example, 111A), data can be specified from the table 112 (for example, 112A) in the partition 111 using the index 113 (for example, 113A) in the partition 111. The data included in one table 112 may be specified from the index 113 only in the partition 111 that includes the table 112. Moreover, each partition 111 may include a lock mechanism 116. This is to prevent two or more threads 110 from competing with each other in relation to the same partition 111. The lock mechanism 116 may be information indicating whether a lock of the partition ill has been acquired. For example, the lock mechanism 116 may be set to a value "1" if a lock has been acquired and may be set to a value "0" if a lock has not been acquired. The lock mechanism 116 may be correlated with the partition 111 and may be outside the partition 111.

The DBMS 412 includes a log buffer 114 and a LLSN manager 115 for each partition 111. The log buffer 114 temporarily stores logs including the update history of the partition 111. The LLSN manager 115 manages LLSN. The "LLSN" is an abbreviation of a local log sequence number. The LLSN is numbers that do not overlap in one partition 111. The LLSN is generated when logs of a transaction belonging to the first-class transaction set (a set of transactions of which results change depending on a transaction execution order) are output. The LLSN may be generated when the logs of a transaction belonging to the second-class transaction set are output without being limited to the first-class transaction set.

The DBMS 412 receives a query from a query issuer and executes one or a plurality of transactions during execution of the received query. Specifically, the DBMS 412 includes a query receiver 421, a query execution plan generator 422, and a query executor 424.

The query receiver 421 receives a query issued by a query issuer. The query is described by a structured query language (SQL), for example. A plurality of transactions may be described by one query, and a plurality of transactions may be described by a plurality of queries. Moreover, the query issuer may be a computer program inside the DBMS 412 and may be a computer program outside the DBMS 412. For example, the external computer program may be a computer program (for example, an application program) executed in the database server 401 and may be a computer program (for example, an application program) executed by an apparatus such as a client computer coupled to the database server 401.

The query execution plan generator 422 generates, from a query received by the query receiver 421, a query execution plan including one or more database operations required for executing the query. The query execution plan is information including one or more database operations and the relation of the execution order of the database operations, for example, and is stored as query execution plan information 423. The query execution plan may be expressed by a tree structure in which a database operation is a node and the relation of the execution order of the database operations is an edge. One or a plurality of transaction sets and whether each transaction set belongs to the first-class transaction set or the second-class transaction set can be specified from one query execution plan or a combination of a plurality of query execution plans.

The query executor 424 executes the query received by the query receiver 421 according to the query execution plan generated by the query execution plan generator 422 and returns an execution result thereof to the query issuer. In this case, the query executor 424 issues a read request (a reference request) to read data required for execution of a database operation and performs the database operation using the data read from the partition ill according to the read request (for example, the query executor 424 calculates new data using the read data (value) and issues a write request to update data in a read source record with the calculated data). The query executor 424 performs the database operation by executing the thread 110. In the DBMS 412, a plurality of threads 110 are executed in parallel. Thus, the processor 414 includes a plurality of cores. The plurality of cores is present in one or a plurality of CPUs. The thread 110 may be referred to as a task. The thread 110 may be implemented using a user thread in which a library or the like is realized as well as a processor, a kernel thread, or the like in which the OS 117 is realized, for example. One transaction corresponding to one or more database operations may be executed by one thread 110. Hereinafter, the thread 110 may be used as the subject of a process performed when the query executor 424 executes the thread 110.

The query executor 424 (the thread 110) issues an I/O request for the external storage apparatus 402 to the OS 117 in order to write logs to the log file 301 in the external storage apparatus 402 during execution of a transaction. The OS 117 receives the I/O request and issues an I/O request to the external storage apparatus 402.

A plurality of I/O queues 201 (201A to 201C) is prepared in the I/O adapter 413. During processing of a transaction, the thread 110 issues an I/O request for writing logs, and the I/O request is stored in the I/O queue 201. Specifically, the I/O request is stored in the I/O queue 201 by the OS 117.

The external storage apparatus 402 stores a plurality of log files 301 (301A to 301C). The write target logs of the I/O request are recorded in the log file 301.

In the present embodiment, the partition 111, the I/O queue 201, and the log file 301 are correlated in one-to-one correspondence. That is, one I/O queue 201 and one log file 301 are present for each partition 111. Specifically, an I/O queue 201A and a log file 301A are correlated with a partition 111A, an I/O queue 201B and a log file 301B are correlated with a partition 111B, and an I/O queue 201C and a log file 301C are correlated with a partition 111C. One or a plurality of threads 110 may be present in one log file 301. However, the processing of the I/O request can be reduced when an interrupt for notifying the completion of an I/O request is transmitted to a specific thread 110 for each I/O queue 201. In this case, the thread 110, the partition 111, and the I/O queue 201 may be correlated in a one-to-one correspondence, for example. In the present embodiment, for the sake of convenience, the thread 110 may be correlated with the log file 301 in a one-to-one correspondence. For example, the thread 110A issues an I/O request of a log indicating that a record in the table 112A of the partition 111A is updated to the log file 301A corresponding to the partition 111A. The issued I/O request is transmitted to the OS 117 via the log buffer 114A. The OS 117 receives the I/O request for the log file 301A and stores the I/O request in the I/O queue 201A corresponding to the log file 301A. The OS 117 transmits the I/O request stored in the I/O queue 201A from the I/O queue 201 to the external storage apparatus 402. As a result, the log which is recording target data of the I/O request is written to the log file 301A.

The configuration of the DBMS 412 illustrated in FIG. 3 is just an example. For example, a certain constituent element may be divided into a plurality of constituent elements, and a plurality of constituent elements may be integrated into one constituent element.

Figure 4:
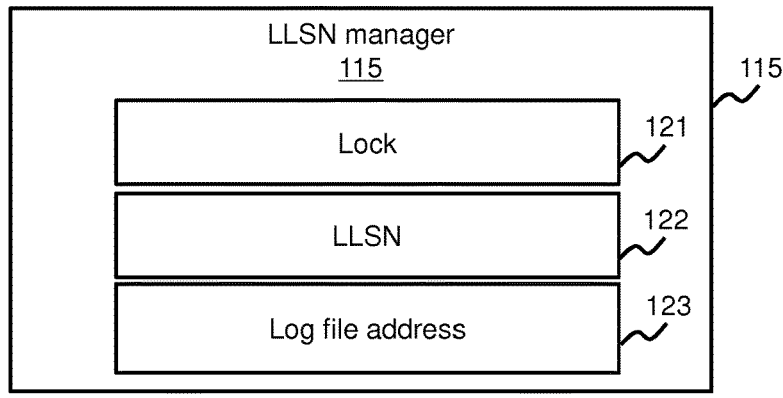
FIG. 4 illustrates a configuration of an LLSN manager.

FIG. 4 illustrates a configuration of the LLSN manager 115.

The LLSN manager 115 includes a lock mechanism 121, a LLSN 122, and a log file address 123.

The lock mechanism 121 may be data indicating whether a lock of the LLSN manager 115 has been acquired similarly to the lock mechanism 116 illustrated in FIG. 3. For example, the lock mechanism 121 may be set to a value "1" if a lock has been acquired and may be set to a value "0" if a lock has not been acquired.

The LLSN 122 is a sequence number (LLSN) of a log for the partition 111 that includes the LLSN manager 115. For example, the LLSN is a combination of an ID of the LLSN manager 115 and a serial number. For example, when the thread 110A generates the LLSN from the LLSN manager 115A, the value indicated by the LLSN 122 is updated to 1-001, 1-002, 1-003, or the like. The LLSN is a combination of the ID "1" of the LLSN manager 115A and an updated serial number.

The log file address 123 is a write destination address of a log in the log file 301 corresponding to the partition 111 that includes the LLSN manager 115. The address (value) indicated by the log file address 123 is added by the size of a log that is output when a log is written to the log file 301.

Figure 5:
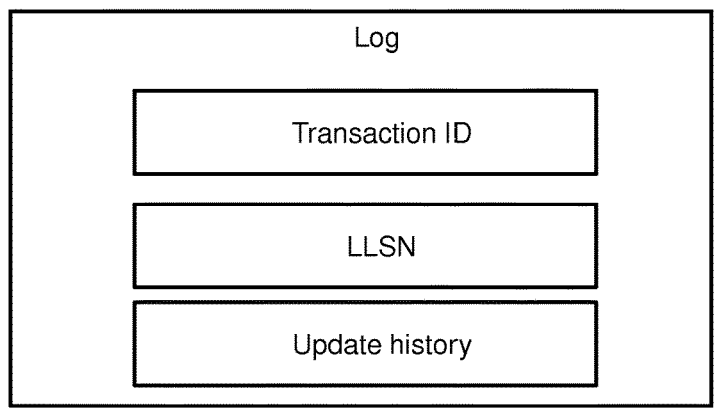
FIG. 5 illustrates a data structure of a log.

FIG. 5 illustrates a data structure of a log.

One log can be generated for one transaction, and each log includes the ID of a transaction, one or more LLSNs generated during execution of the transaction, and information indicating the update history of the transaction. The number of LLSNs included in a log is the same as the number of partitions 111 updated during execution of a transaction.

Figure 6:
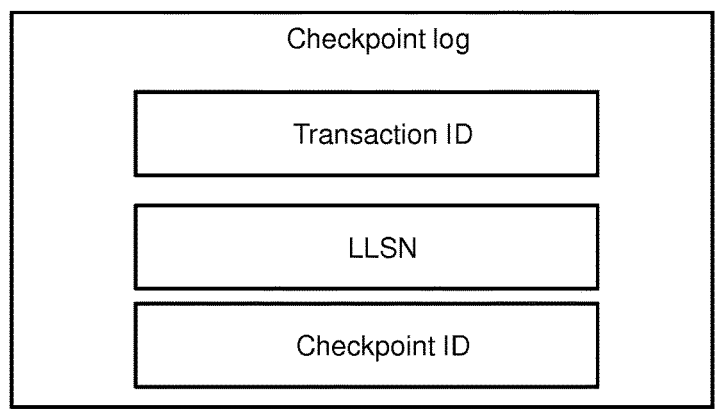
FIG. 6 illustrates a data structure of a checkpoint log.

FIG. 6 illustrates a data structure of a checkpoint log.

A checkpoint log is a log in which a checkpoint is generated. A checkpoint log includes the ID of a transaction in which a checkpoint is generated, all LLSNs generated during generation of the checkpoint, and the ID of the generated checkpoint. During recovery of a database, the time point at which recovery is performed can be specified using a checkpoint ID. The checkpoint ID may be a value indicating the time at which a checkpoint is generated.

Figure 7:
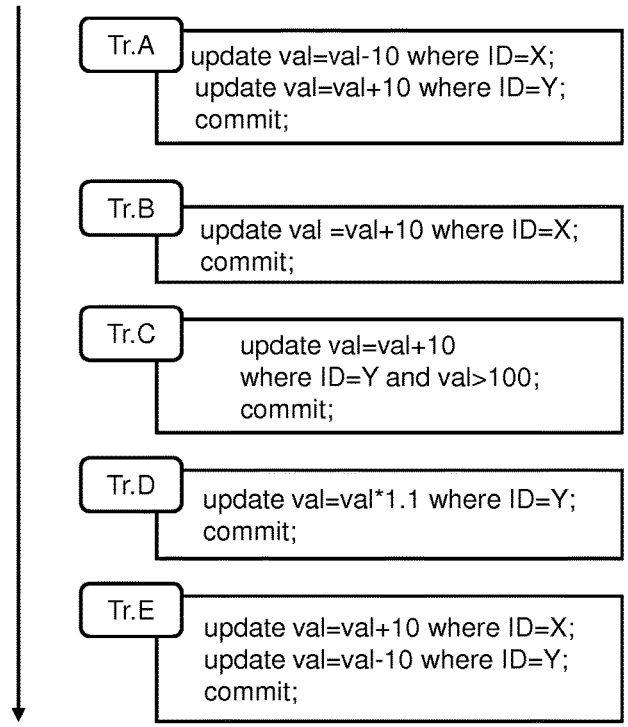
FIG. 7 illustrates an example of a transaction set.
Figure 8:
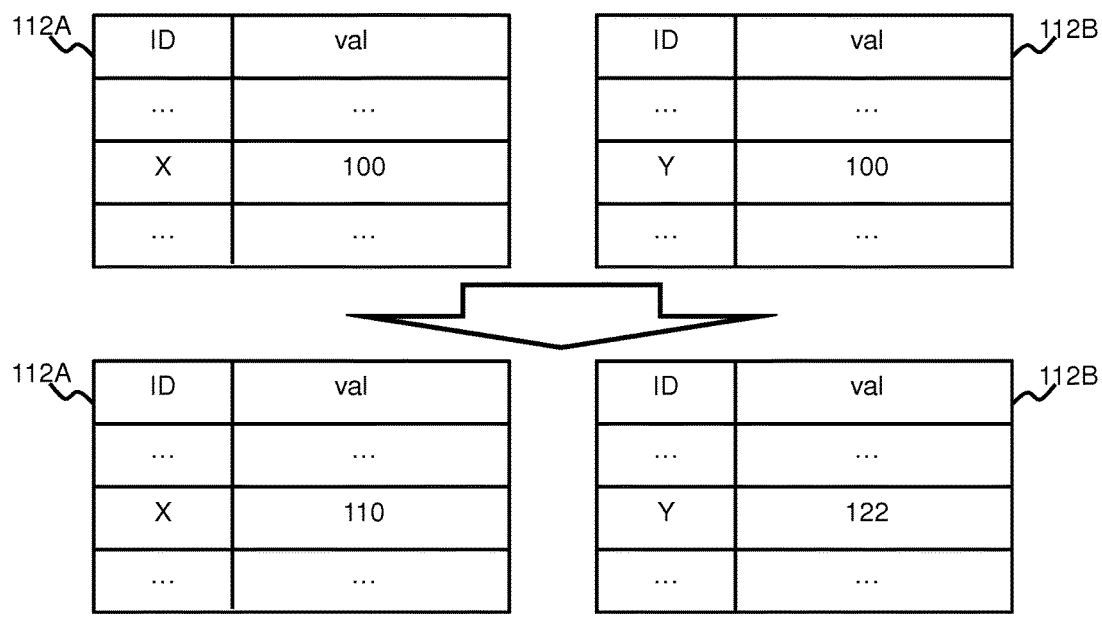
FIG. 8 illustrates tables before and after execution of a transaction set.

FIG. 7 illustrates an example of a transaction set. FIG. 8 illustrates tables 112A and 112B before and after execution of a transaction set. In FIG. 7 (and FIGS. 9 to 11 described later), a transaction is abbreviated as "Tr.". Moreover, in the following description, a record has a row ID and a Val (value), a record of the row ID:X is referred to as a record X and a record of the row ID:Y is referred to as a record Y.

The transaction set illustrated in FIG. 7 is the first-class transaction set, that is, a set of transactions of which results change depending on a transaction execution order. The records X and Y are updated depending on a transaction set.

As illustrated in FIG. 8, the record X is a record present in the table 112A within the partition 111A and the record Y is a record present in the table 112B within the partition 111B. Before the transaction set illustrated in FIG. 7 is executed, the Val (value) of the record X is "100" and the Val (value) of the record Y is "100". With execution of the transaction set illustrated in FIG. 7, the Val (value) of the record X is updated to "110" and the Val (value) of the record Y is updated to "122".

According to the transaction set illustrated in FIG. 7, the results of the transactions A, B, and E change depending on an execution order. This is because these transactions update the same record X. Similarly, the results of the transactions A, C, and D change depending on an execution order. This is because these transactions update the same record Y.

However, the results of the transaction B and the transaction C or D do not change regardless an execution order thereof. This is because these transactions update different records X and Y (in order words, the updated records are not common).

Thus, when a database is recovered based on logs, it is necessary to record a minimum necessary transaction execution order. The implementation method for defining the partial order for the executed transaction set is not limited to one method, and the following method can be used as a method of recording a minimum necessary order relation, for example. For example, as illustrated in FIG. 2, a sequence number (a log generation sequence number) according to a committed order is recorded in the log of a transaction (which is one of transactions of which results are different depending on a transaction execution order) which is executed between an arbitrary checkpoint 1 and a checkpoint 2 generated later than the checkpoint 1 and which belongs to the first-class transaction set. On the other hand, the sequence number is not recorded in the log of a transaction (which is one of transactions of which results don't change depending on a transaction execution order and which is executed between the checkpoint 1 and the checkpoint 2) that belongs to the second-class transaction set. In this way, it is possible to define the partial order of the logs of the first-class transaction set.

In the present embodiment, during execution of one transaction, LLSNs are generated for each updated partition 111. The LLSNs generated for one partition 111 are the sequence numbers of the partition 111 and are not related to the LLSNs of the other partition 111. That is, in the present embodiment, a series of LLSNs (sequence numbers) are generated for each partition 111 and the generated LLSNs are recorded in a log, whereby the partial order is defined for the first transaction set.

Specifically, logs are output in the following manner. That is, as described above, the partition 111 and the log file 301 are prepared in a one-to-one correspondence, and the logs including the update history of the partition 111 are written to the log file 301 corresponding to the partition 111. Moreover, N partitions 111 (N is an integer of 2 or more) may be updated during execution of one transaction. However, in this case, N logs are not written to N log files respectively corresponding to the N partitions 111, but M logs (M is smaller than N) are respectively written to log files (M log files) 301 whose number is smaller than the number (N) of updated partitions 111. In the present embodiment, M=1. That is, in the present embodiment, regardless of the value of N (the number of partitions 111 updated during execution of one transaction), a log is written to one log file 301 corresponding to any one of the updated partitions 111. However, N LLSNs respectively corresponding to the N updated partitions are written to the log.

Figure 9:
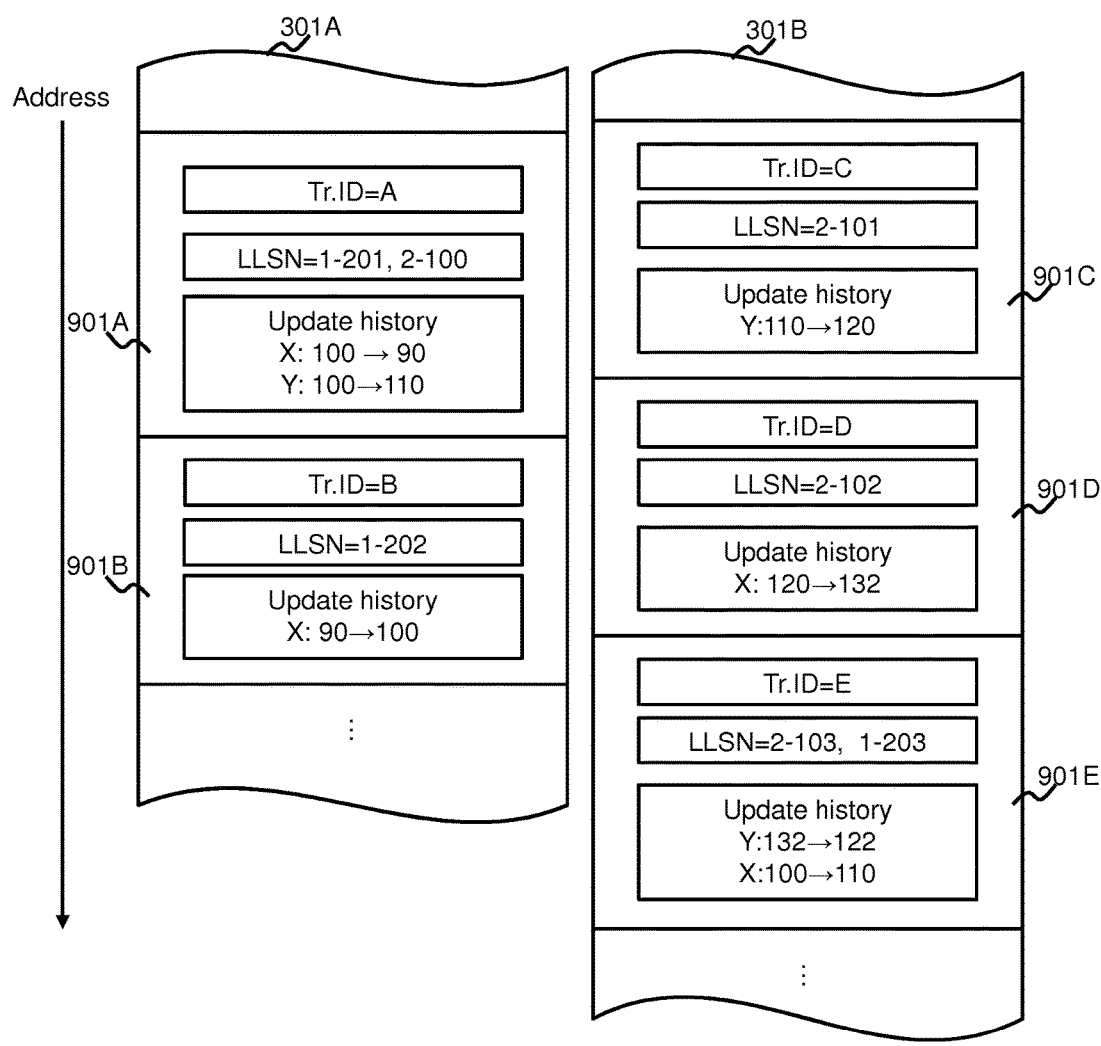
FIG. 9 illustrates an example of the log output according to an embodiment.

FIG. 9 illustrates an example of the log output according to the embodiment.

It is assumed that, before the transaction set illustrated in FIG. 7 is executed, the LLSN of the partition 111A has a value of 1-201 and the LLSN of the partition 111B has a value of 2-100. These values are examples only, and the LLSNs may have other values.

First, with the execution of the transaction A, both the record X of the partition 111A and the record Y of the partition 111B are updated. Thus, LLSN=1-201 is generated from the LLSN manager 115A and LLSN=2-100 is generated from the LLSN manager 115B. In this step, the LLSNs of the LLSN managers 115A and 115B may be respectively incremented by 1, and as a result, the LLSN of the LLSN manager 115A may become 1-202 and the LLSN of the LLSN manager 115B may become 2-101. Moreover, when the partitions 111A and 111B are updated, a log output destination is any one of the log files 301A and 301B respectively corresponding to the partitions 111A and 111B (for example, the output destination may be sequentially switched according to the round-robin method and may be determined in advance as any one of the log files). In this example, the log is output to the log file A. Thus, a log file address is acquired from the LLSN manager 115A, and a value corresponding to the size of the output log is added to the log file address in the LLSN manager 115A. The thread 110A having executed the transaction A records the generated LLSNs 1-201 and 2-100, the transaction ID=A, and the update history of the records X and Y in a log and writes a log 901A in which these items of information are recorded in the log file 301A from a position corresponding to the acquired log file address. Specifically, the thread 110A stores the log 901A in the log buffer 114A and issues a write request that designates the acquired log file address using the log 901A as a write target. The OS 117 receives the write request, writes the write request to the I/O queue 201A corresponding to the log file 301A, and transmits the write request to the external storage apparatus 402 from the I/O queue 201A. The external storage apparatus 402 receives the write request, writes the write target log 901A corresponding to the write request to the log file 301A, and returns a completion response to the write request. The completion response is returned to the DBMS 412 via the OS 117.

Subsequently, with the execution of the transaction B, only the record X of the partition 111A is updated. Thus, the thread 110A having executed the transaction B generates LLSN=1-202 from the LLSN manager 115A (the LLSN of the LLSN manager 115A is incremented to 1-203), acquires a log file address (the size of an output target log is added to the log file address of the LLSN manager 115A), and outputs a log 901B including the LLSN=1-202, the transaction ID=B, and the update history of the record X to the log file 301A (the acquired log file address) corresponding to the partition 111A updated by the execution of the transaction B.

Moreover, with the execution of the transaction C, only the record Y of the partition 111B is updated. Thus, the thread 110B having executed the transaction C generates LLSN=2-101 from the LLSN manager 115B (the LLSN of the LLSN manager 115B is incremented to 2-102), acquires a log file address (the size of an output target log is added to the log file address of the LLSN manager 115B), and outputs a log 901C including the LLSN=2-101, the transaction ID=C, and the update history of the record Y to the log file 301B (the acquired log file address) corresponding to the partition 111B updated by the execution of the transaction C.

Similarly, when the transaction D is executed, LLSN=2-102 is generated from the LLSN manager 115B, and a log 901D including the LLSN=2-102 is written to the log file 301B.

Finally, when the transaction E is executed, LLSNs=1-103 and 2-103 are respectively generated from the LLSN managers 115A and 115B, and a log 901E including the generated LLSNs is written to the log file 301B.

When the logs are output in this manner, by referring to the LLSNs of the respective logs, the order of transactions A→B→E and transactions A→C→D→E can be recovered. In the present embodiment, a first LLSN being larger than a second LLSN for the same partition means that the first LLSN is generated later (in the future) than the second LLSN. In one modified example, the first LLSN being larger than the second LLSN may mean that the first LLSN is generated earlier (in the past) than the second LLSN. That is, it is only necessary to specify the order relation from the magnitude relation of LLSNs.

In general, when an order relation (this will be represented by "≥" for the sake of convenience) between transactions is defined by a magnitude relation of LLSNs of any one of the LLSN managers 115, the partial order of an entire set of transaction is determined except several exceptions. For example, transactions may be arranged (A≥B) in the order of transactions A→B in the LLSNs of the LLSN manager 115A, and transactions may be arranged (B≥A) in the order of transactions B→A in the LLSNs of the LLSN manager 115B. In this case, the transactions A and B are handled such that the order of the transactions is not defined. Actually, the transactions A and B do not release the locks of the records updated by the transactions A and B until the transactions end. Thus, such an event occurs since the records updated by the transactions A and B are different, and the transactions A and B may be executed in an arbitrary order.

Hereinafter, Comparative Examples 1 and 2 of the log output of the transaction set illustrated in FIG. 7 will be described.

Figure 10:
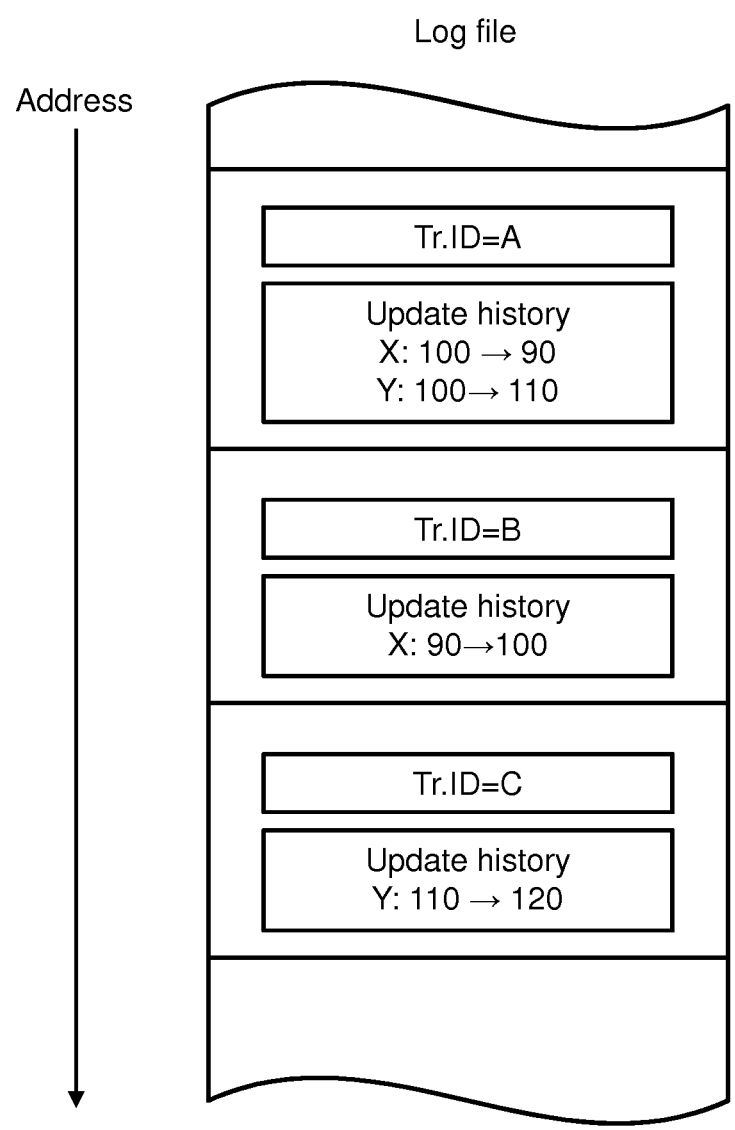
FIG. 10 illustrates an example of the log output according to Comparative Example 1.

FIG. 10 illustrates an example of the log output according to Comparative Example 1.

In Comparative Example 1, five logs corresponding to five transactions A to E are output to a single log file. In Comparative Example 1, the logs are output to the log file in the transaction execution order. In this case, even when two or more transactions are executed in parallel, the logs are output sequentially, and an I/O resource (for example, a single I/O queue corresponding to a single log file) may compete between transactions.

In the present embodiment, a plurality of log files is prepared, and a plurality of I/O resources (for example, I/O queues) respectively corresponding to the plurality of log files is prepared. In this way, it is possible to reduce competition of I/O resources.

Figure 11:
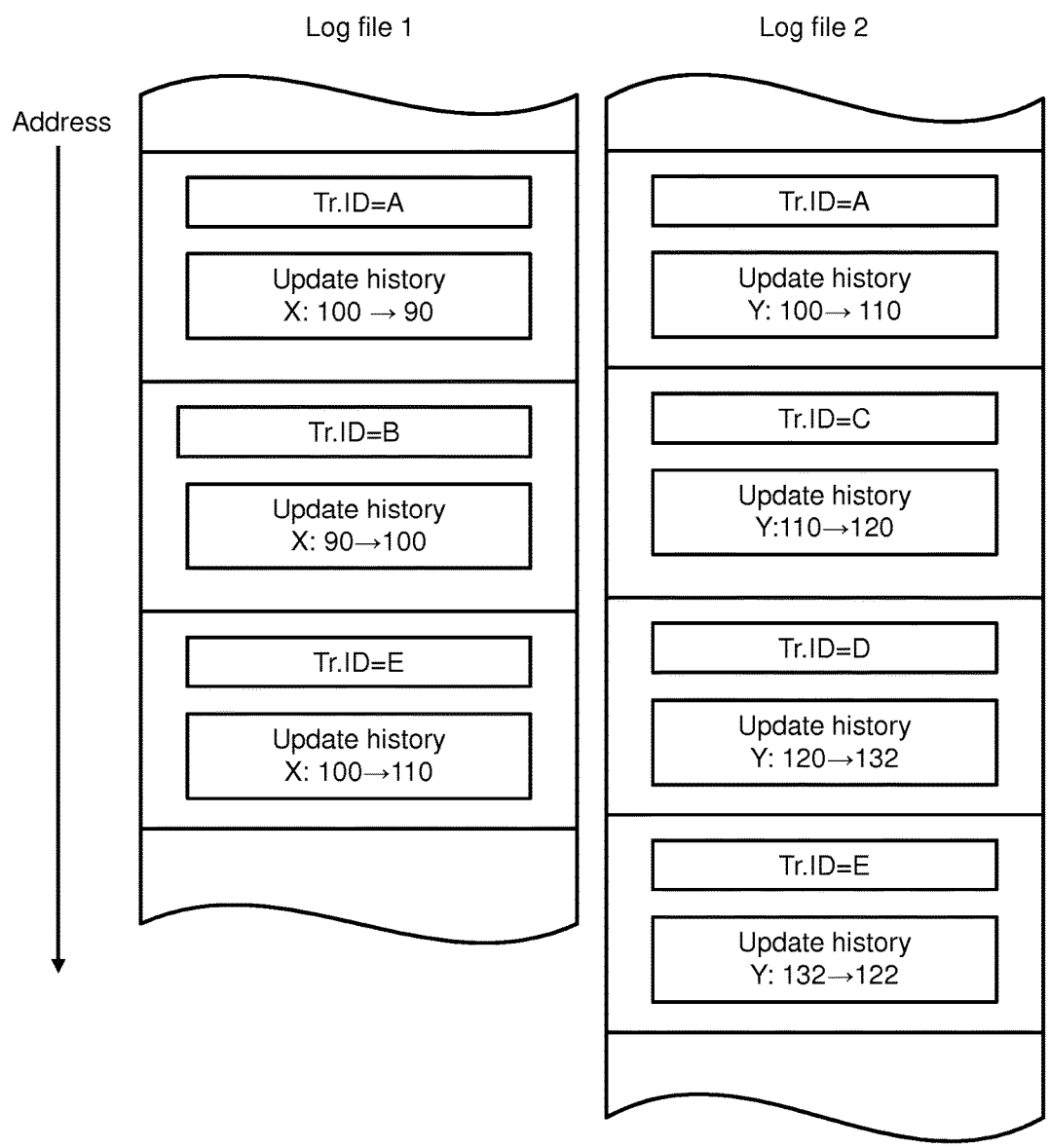
FIG. 11 illustrates an example of the log output according to Comparative Example 2.

FIG. 11 illustrates an example of the log output according to Comparative Example 2.

Comparative Example 2 illustrates an example of the log output performed in a distributed database. For a transaction that updates one of the partitions 111A and 111B like the transactions B, C, and D, the logs are output in the same manner as that of the embodiment. However, for a transaction that updates both partitions 111A and 111B like the transaction A (and E), the same number of logs as the number of updated partitions are respectively output to the same number of log files. Thus, the number of log I/Os is larger than that of the embodiment.

That is, in the present embodiment, even when a transaction updates a plurality of partitions, the number of logs written is smaller than the number of updated partitions. Thus, it is possible to suppress the number of log I/Os.

In the present embodiment, as described above, there is a case in which the execution order is not defined depending on a transaction. For example, it is indefinite on the log which one of the transactions B and C has completed execution earlier than the other. Thus, in general, it is not possible to recover the database to the state of an arbitrary timing other than the latest state. Therefore, in the present embodiment, as described above, by generating the checkpoint, it is possible to record and recover the state of the database at an arbitrary time point.

Hereinafter, the processes performed in the embodiment will be described.

Figure 12:
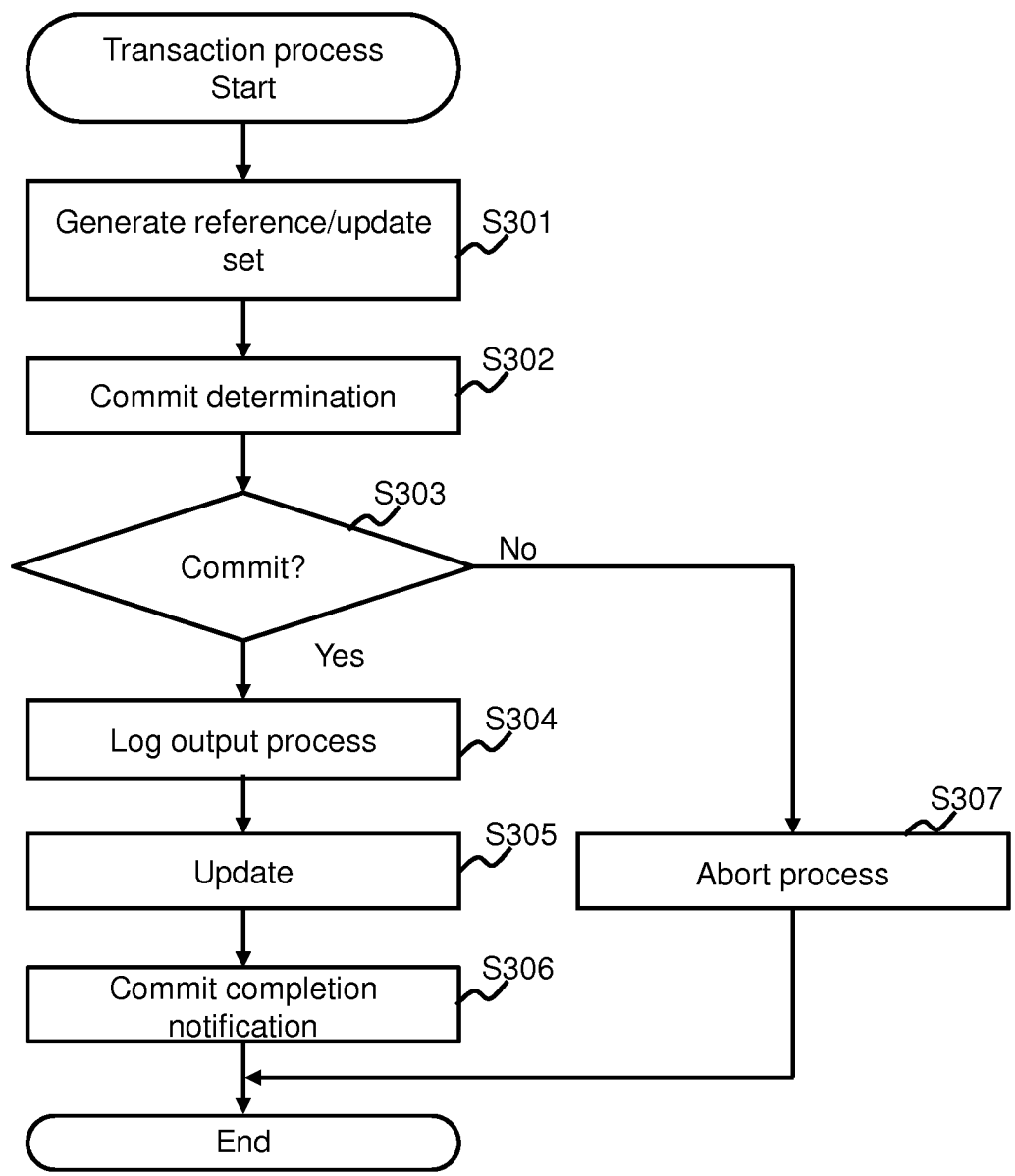
FIG. 12 is a flowchart of a transaction process.

FIG. 12 is a flowchart of a transaction process. In the following description, one transaction A will be described as an example. Thus, a thread that executes the transaction A is the thread 110A, and the partitions updated by the transaction A are the partitions 111A and 111B, and the log files corresponding to the partitions 111A and 111B are the log files 301A and 301B, respectively.

When the transaction A starts, the thread 110A generates a reference/update set for each of the partitions 111A and 111B based on an instruction (an instruction in a query) corresponding to the transaction A (S301). The reference/update set is a set of a reference to a record (a read request for a partition) and an update of a record (a write request for a partition). Although the reference/update set is a request set for updating partitions, at the time point of S301, the partitions 111A and 111B are not updated but the reference/update set is maintained in a local memory area (an area (not illustrated) secured on the main memory 461) corresponding to the transaction A.

Subsequently, the thread 110A makes a commit determination (S302). The commit determination is made by determining whether consistency with other transactions can be maintained even when the transaction A updates the partitions 111A and 111B based on the reference/update set according to an isolation level of a database.

If the commit determination results in NG (S303: No), the thread 110A performs an abort process (S307).

When the commit determination results in OK (S303: Yes), the thread 110A executes a log output process (S304).

Subsequently, the thread 110A updates the partitions 111A and 111B based on the reference/update set (S305), transmits a commit completion notification (S306), and ends the transaction.

Figure 13:
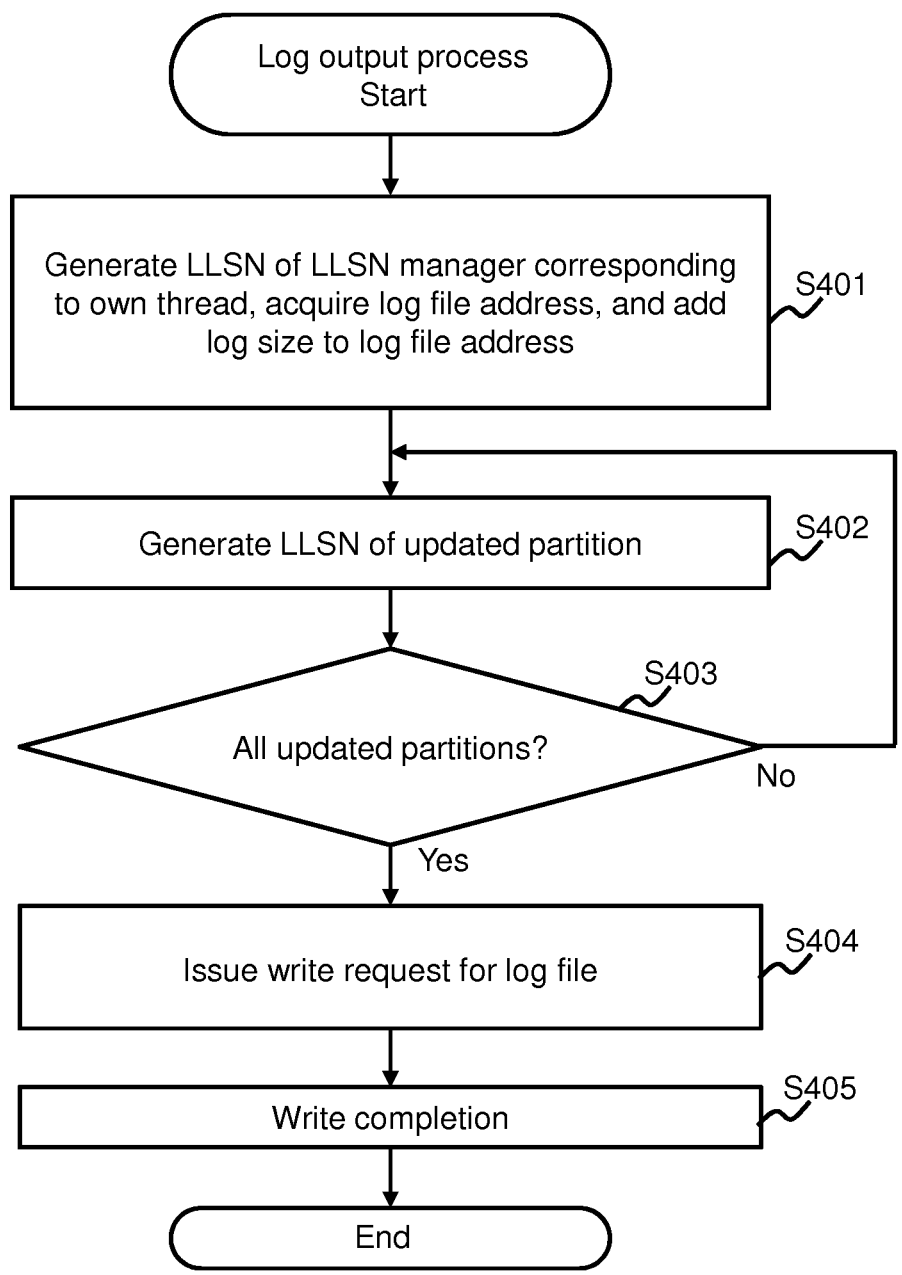
FIG. 13 is a flowchart of a log output process.

FIG. 13 is a flowchart of the log output process (S304 in FIG. 12).

The LLSN manager 115 of the log file 301A correlated with the thread 110A that is executing the transaction A is the LLSN manager 115A. The thread 110A acquires a log file address from the LLSN manager 115A and adds the size of the log of the transaction A to the log file address of the LLSN manager 115A (S401). The thread 110A acquires a lock of the LLSN manager 115A before this series of operations are performed and releases the lock after the operations are performed. When the LLSN manager 115 and the log file 301 are not correlated with the thread 110A, the thread 110A selects an arbitrary LLSN manager 115 and performs the same process on the selected LLSN manager 115. However, in order to avoid deadlock in a recovery process described later, the log needs to be written to the log file 301 corresponding to the LLSN manager 115 operated in S401.

Subsequently, the thread 110A generates the LLSN of the partition 111A or 111B updated by the execution of the transaction A (S402). Depending on an isolation level or a data structure of a database, it may be also necessary to generate the LLSN of the partition referenced by the execution of the transaction A.

When there is a partition, the LLSN of which is not generated, among the updated partitions 111A and 111B (S403: No), the thread 110A performs S402 on the partition, the LLSN of which is not generated. On the other hand, if the LLSNs of all of the updated partitions 111A and 111B have been generated (S403: No), the thread 110A generates the log 901A (see FIG. 9), writes the log 901A to the log buffer 114A, and issues a write request for the log 901A (a write request that designates the log file address acquired from the LLSN manager 115A) (S404). The thread 110A completes the write when a write completion notification is received from the external storage apparatus 402 via the I/O adapter 413 (S405) and ends the log output flow.

Figure 14:
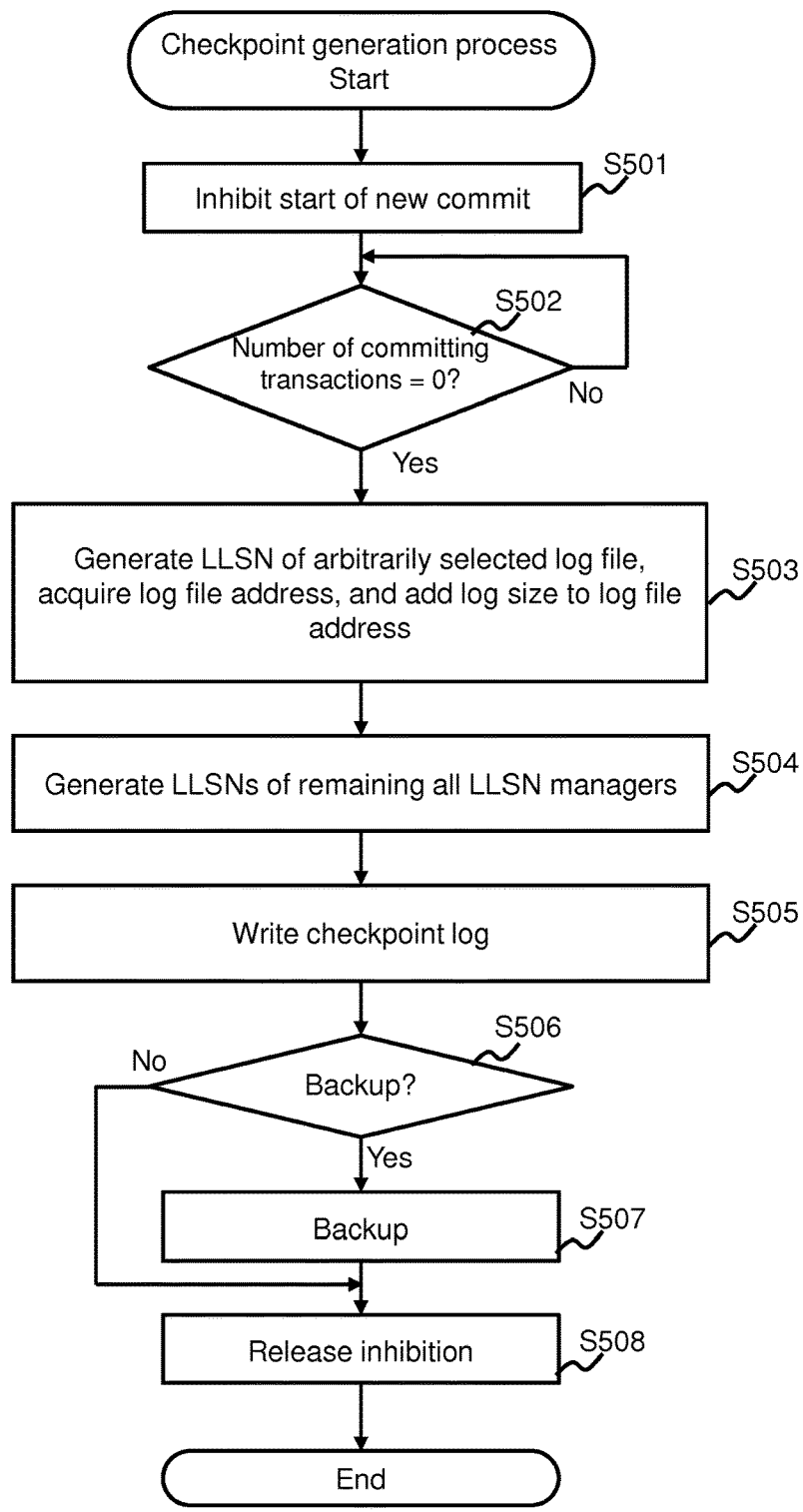
FIG. 14 is a flowchart of a checkpoint generation process.

FIG. 14 is a flowchart of a checkpoint generation process. In the description of FIG. 14, it is assumed that a thread that generates a checkpoint is the thread 110A.

First, the thread 110A inhibits the start of new commit (S501). Specifically, the thread 110A prepares a flag bit that indicates inhibition of new commit in a shared thread area and sets an initial value thereof to 0. When inhibiting the start of new commit, the thread 110A changes the flag bit to 1. A thread that executes a transaction checks the flag bit at the start of execution of a commit process and executes the commit process when the flag bit is 0 only while remaining in a waiting state until the flag bit changes to 0 when the flag bit is 1. After the thread 110A performs the process of inhibiting the start of new commit, no thread 110 can start commitment and the commitment progresses for a committed transaction only.

The thread 110A waits until the number of committing transactions reaches 0 (S502: No). When the number of committing transactions reaches 0 (S502: Yes), the thread 110A generates LLSNs and acquires a log file address from the LLSN manager 115 (for example, 115A) corresponding to an arbitrarily selected log file 301 (for example, 301A), and adds a value corresponding to the size of the checkpoint log to the log file address in the LLSN manager 115 (for example, 115A) (S503).

Further, the thread 110A generates all LLSNs corresponding to the remaining log files (S504). The thread 110A creates a checkpoint log including the LLSNs generated in S503, the LLSNs generated in S504, and a checkpoint ID. The thread 110A writes a log write request (the write target of which is the created checkpoint log) that designates the log file address acquired in S503 to the log buffer 114 (for example, 114A) corresponding to the arbitrarily selected log file 301 (for example, 301A) and issues the log write request from the log buffer 114 (for example, 114A) (S505).

Subsequently, the thread 110A determines whether a database backup condition is satisfied (S506). The condition may be satisfied when the number of times the checkpoint has been generated reaches N (N is a natural number) and may be satisfied when a predetermined period has elapsed from the time point at which a previous backup operations was performed.

When the determination result in S506 is true (S506: Yes), the thread 110A correlates the backup (that is, the database (the table 112 and the index 113 of each partition 111) on the main memory 416) of the database with the checkpoint ID included in the checkpoint log and stores the database (image) correlated with the checkpoint ID in the external storage apparatus 402 (S507). This operation is not always necessary for all checkpoints. However, by backing up the database during writing of the checkpoint log, it is possible to recover the database (or the database at the time point close to the time point of checkpoints) at the time point of generation of checkpoints at a high speed. The thread may store information (hereinafter referred to as checkpoint management information) including the correspondence between the backed-up database (image), the checkpoint ID, and a write destination address of the checkpoint log including the checkpoint ID in a storage area (for example, the main memory 416) inside or outside the database server 401.

After the backup is completed or when the determination result in S506 is false (S506: No), the thread 110A releases the inhibition of the start of new commit (S508) and the checkpoint generation process ends. Specifically, the thread 110A changes the flag bit that indicates the inhibition of new commit from 1 to 0.

Figure 15:
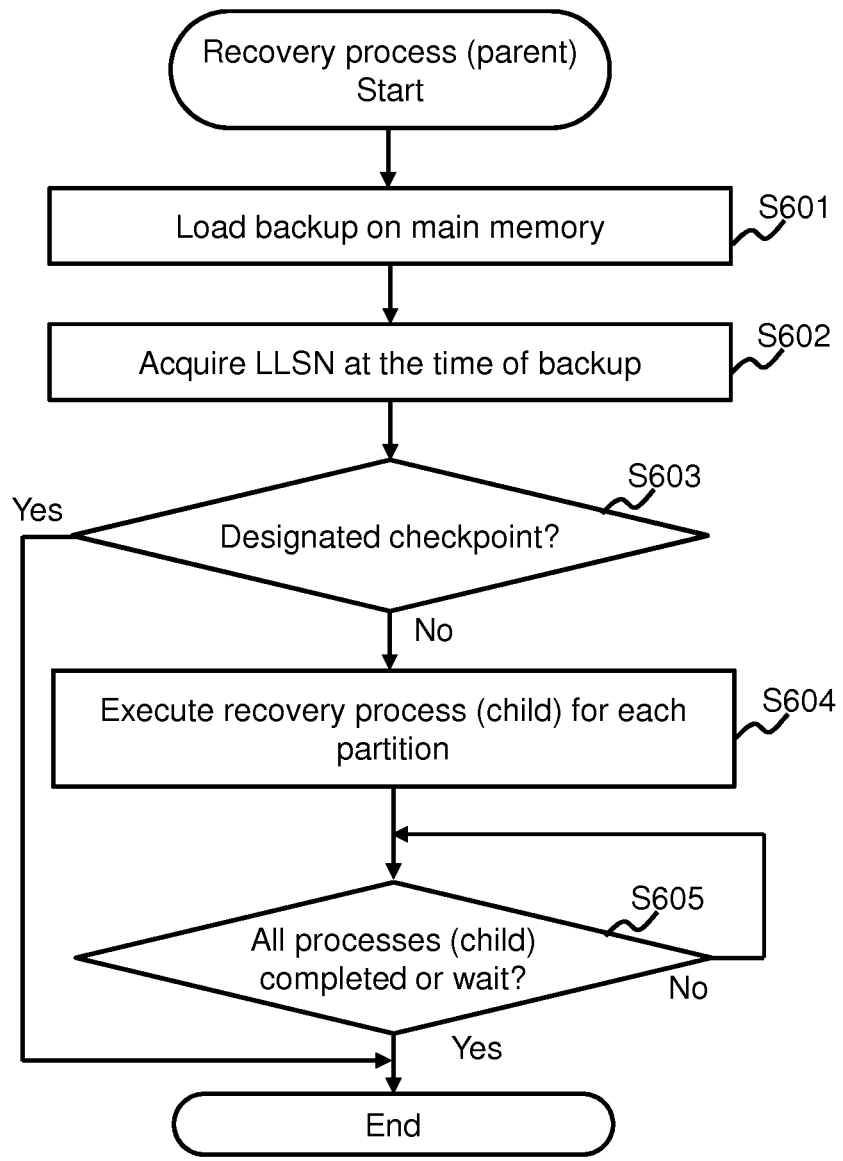
FIG. 15 is a flowchart of a database recovery process (parent).

FIG. 15 is a flowchart of a database recovery process (parent). In the description of FIG. 15 (and FIG. 16), it is assumed that a thread that recovers the database is the thread 110A.

The thread 110A loads a database (backup image) correlated with the checkpoint ID of a designated checkpoint or a database (backup image) correlated with a checkpoint ID generated earlier than the checkpoint ID of the designated checkpoint from the external storage apparatus 402 on the main memory 416 based on the checkpoint management information (S601). The checkpoint ID may be designated in the query received from a query issuer and may be designated by a computer (for example, a management computer) (not illustrated) coupled to the database server 401.

The thread 110A acquires a checkpoint log including the checkpoint ID correlated with the database from the address (log file) of the checkpoint log based on the checkpoint management information and sets the LLSNs in the log to the LLSNs of the LLSN managers 115 in the partitions 111 corresponding to the LLSNs (S602). For example, a LLSN which starts with the number 1 is set to the LLSN of the LLSN manager 115A, and a LLSN which starts with the number 2 is set to the LLSN of the LLSN manager 115B.

When the checkpoint ID correlated with the loaded database is different from the designated checkpoint ID (S603: No), the thread 110A causes the threads 110 corresponding to the respective partitions 111 to execute a recovery process (child) (S604). As for the partition 111A, the thread 110A executes the recovery process (child). The thread 110A waits for the end of the recovery process (child) (S605: Yes) and ends the recovery process (parent).

On the other hand, when the checkpoint ID correlated with the loaded database is identical to the designated checkpoint ID (S603: Yes), the thread 110A ends the recovery process (parent) without executing S604 and S605. This is because the database loaded in S601 is the database to be recovered.

Figure 16:
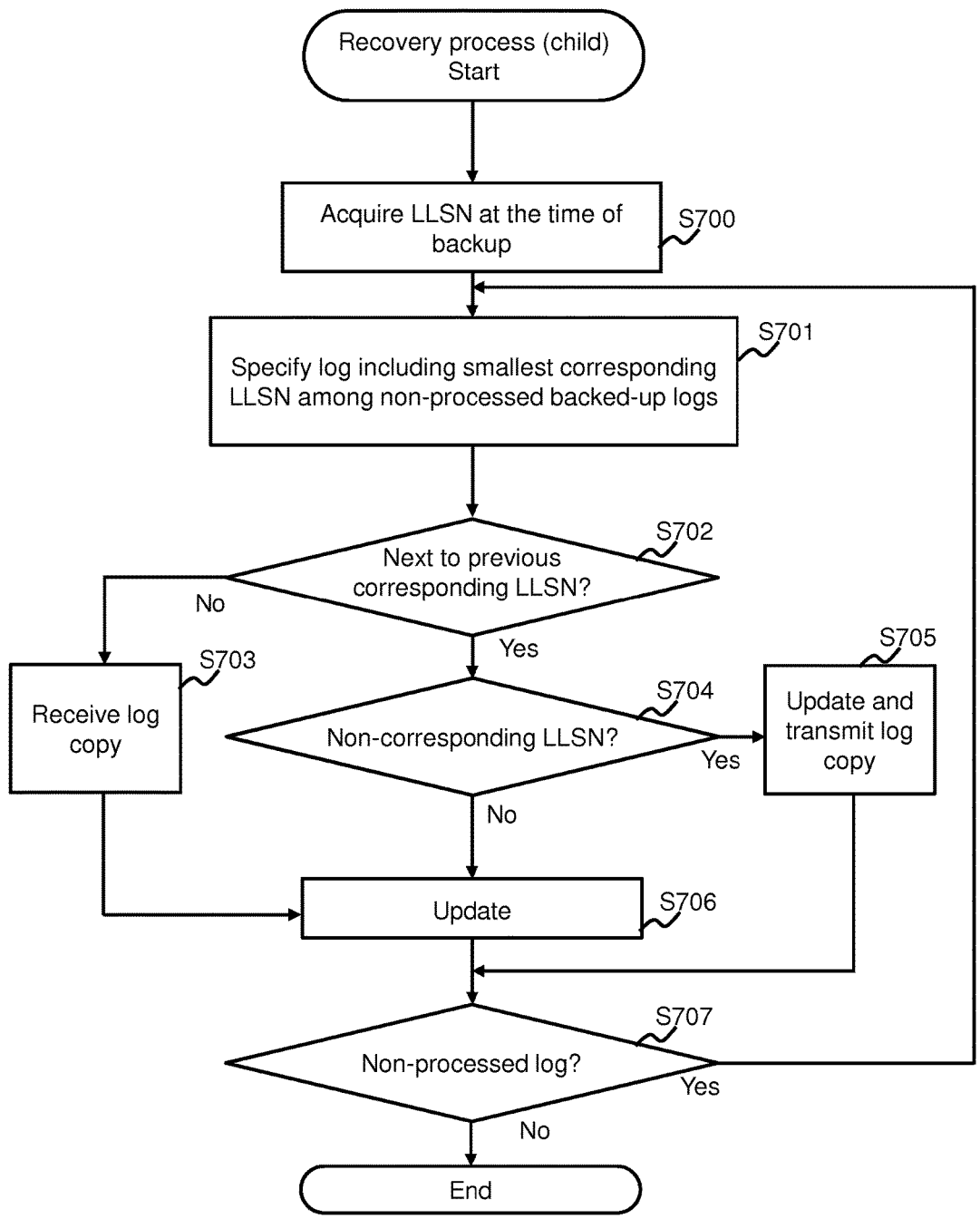
FIG. 16 is a flowchart of a database recovery process (child).

FIG. 16 is a flowchart of a database recovery process (child).

The recovery process (child) is executed for each partition 111. Hereinafter, the recovery process (child) will be described for one partition 111B as an example.

The thread 110B acquires the LLSN (the LLSN in the LLSN manager 115B) set in the recovery process (parent) as the LLSN at the time point of backup (S700). Hereinafter, in the log file 301B corresponding to the partition 111B, a log including an LLSN larger than the LLSN (the LLSN generated earlier than the time point of generation of the designated checkpoint ID) acquired in S705 and older than the designated checkpoint ID will be referred to as a "backed-up log". A backed-up log including the largest LLSN of the backed-up logs may be a terminating log of the log file 301B. Moreover, the backed-up logs may include a backed-up log that includes an LLSN other than the LLSN of the partition 111B in addition to the LLSN of the partition 111B. Hereinafter, the LLSN of the partition 111B will be referred to as a "corresponding LLSN" and the LLSN other than the LLSN of the partition 111B will be referred to as a "non-corresponding LLSN".

The thread 110B specifies a backed-up log including the smallest corresponding LLSN among the non-processed backed-up logs in the log file 301B corresponding to the partition 111B (S701). Hereinafter, the backed-up log specified in S701 will be referred to as a "target log".

The thread 110B determines whether the corresponding LLSN in the target log is a corresponding LLSN (a corresponding LLSN obtained by adding 1 to the previous corresponding LLSN in the backed-up log processed in S705 or S706) next to the previous corresponding LLSN in the backed-up log processed in S705 or S706 (S702).

When the determination result in S702 is true (S702: Yes), the thread 110B determines whether a non-corresponding LLSN is included in the target log.

When the determination result in S704 is true (S704: Yes), the thread 110B updates the partition 111B within the update history in the target log and transmits a copy of the target log to a thread (a thread having executing the recovery process (child) of the partition corresponding to the non-corresponding LLSN) corresponding to the partition corresponding to the non-corresponding LLSN (S705). For example, when the starting number of the non-corresponding LLSN is 1, the copy of the target log is transmitted to the thread 110A. When two or more non-corresponding LLSNs are present, the copy of the target log is transmitted to threads corresponding to two or more partitions corresponding to the two or more non-corresponding LLSNs.

When the determination result in S704 is false (S704: No), the thread 110B updates the partition 111B according to the update history in the target log (S706).

When the determination result in S702 is false (S702: No), it means that a log including the history of update to be executed is stored in a log file other than the log file 301B. Thus, the thread 110B waits for a copy of a log (a log including a corresponding LLSN next to a previous corresponding LLSN in the backed-up log processed in S705 or S706) including the history of update to be executed from the other thread contrary to S705. When the copy of the log is received (S703), the thread 110B updates the partition 111B according to the update history in the copy of the log (S706).

After S705 or S706 is performed, the thread 110B determines whether there is a non-processed backed-up log (S707). When a non-processed backed-up log is present (S707: Yes), S701 is performed again. When a non-processed backed-up log is not present (S707: Yes), the recovery process (child) on the partition 111B ends.

While an embodiment has been described, the present invention is not limited to the embodiment.

For example, a DBMS other than the in-memory database may be employed as the DBMS. A plurality of database portions that forms a database may be distributed to a plurality of different database servers and at least one of the plurality of database portions may be stored in an external storage apparatus.

Moreover, the log file 301 (and a database portion) may be stored in the storage device 415 in the database server 401 instead of the external storage apparatus 402.

Moreover, sequence numbers (log generation order like LLSN) of the logs of transactions belonging to the second-class transaction set may be recorded. However, similarly to the embodiment, when LLSNs are not recorded in the logs of the transactions belonging to the second-class transaction set, since it is not necessary to generate LLSNs although logs are generated, it is possible to reduce the load of the processor 414.

Moreover, another log storage area may be used instead of the log file 301. For example, the log storage area may be an area in the external storage apparatus 402, the main memory 416, or the storage device 415, and a log file generated for each log may be written to the area. That is, although a plurality of logs are written to one log file in the above-described embodiment, one log file for one log may be written to the log storage area in one modified example.

Moreover, the LLSN may be combination of the ID of the corresponding LLSN manager 115 and a timestamp.

Moreover, two or more checkpoint logs may be generated for the same checkpoint, and all LLSNs corresponding to all LLSN managers 115 may be recorded in the two or more checkpoint logs. However, the number of checkpoint logs generated for the same checkpoint is preferably smaller than the number of partitions 111. This is to reduce the number of log I/Os. The checkpoint log may be stored in an area (for example, the main memory 416) other than the log file.

Moreover, the recovery process may be performed by a recovery executer (not illustrated) provided separately from the query executer instead of the thread (the query executer). That is, in the embodiment, although the query executer serves as a recovery executer, a recovery executer may be provided separately from the query executer.

REFERENCE SIGNS LIST

401: Database server
402: External storage apparatus

The invention claimed is:

1. A database management system for managing a database that has a plurality of partitions including at least a first partition and a second partition, comprising:
   a processor; and a memory coupled to the processor and that stores instructions that cause the processor to execute:
a query receiver configured to receive a query on the database from a query issuer; and
a query executor configured to execute a plurality of transactions on the plurality of partitions of the database based on information relating to the received query, generate a log for each transaction, and issue log write requests for writing the generated logs in at least a first log storage area corresponding to the first partition and a second log storage area corresponding to the second partition,
wherein the query executor is further configured to sequentially record sequence numbers in the logs of the transactions belonging to a first-class transaction set which is a set of transactions of which results are different depending on a transaction execution order, and
wherein the query executor is further configured to sequentially record the sequence numbers in the logs of the transactions belonging to the first-class transaction set separately for the first partition and the second partition, and
wherein, for one of the transactions that updates both the first partition and the second partition and belongs to the first-class transaction set, the generated log for the one of the transactions includes a sequence number for the first partition and a sequence number for the second partition and the log write request to write the generated log is issued to the first log storage area and not to the second log storage area.

2. The database management system according to claim 1, wherein the memory stores the instructions that cause the processor to further execute:
a plurality of sequence number managers configured to separately manage the sequence numbers of the logs with respect to each of a plurality of partitions of the database, including at least a first sequence number manage configured to manage the sequence numbers of the logs for each of the transactions with respect to the first partition and a second sequence number manage configured to manage the sequence numbers of the logs for each of the transactions with respect to the second partition,
wherein the sequence number managed by each sequence number manager is updated every time the log of a transaction that has updated the database portion corresponding to the sequence number manager is generated,
M logs (M is an integer of 1 or more and N or less) are generated as the logs of a transaction that has updated N database portions (N is an integer of 2 or more) among the plurality of database portions, and
at least one of the M logs includes two or more sequence numbers among N sequence numbers respectively corresponding to the N database portions.

3. The database management system according to claim 2, wherein the query executor is further configured to generate one or more checkpoint logs including all sequence numbers respectively corresponding to all sequence number managers for each of a plurality of checkpoints.

4. The database management system according to claim 3, wherein the number of checkpoint logs in each checkpoint is smaller than the number of partitions.

5. The database management system according to claim 2, wherein the database is present on a main memory.

6. The database management system according to claim 3, further comprising:
a recovery executer configured to recover a database at a time point of a designated first checkpoint,
wherein
the query executor is further configured to back up a database at least at one checkpoint among the plurality of checkpoints, and
the recovery executer is configured to
load a database corresponding to a second checkpoint which is the same as the first checkpoint or earlier than the first checkpoint, among backed-up databases; and
set sequence numbers in a checkpoint log corresponding to the second checkpoint to the sequence number managers corresponding to the sequence numbers, respectively.

7. The database management system according to claim 6, wherein
when the second checkpoint is different from the first checkpoint, the recovery executer is configured to recover, for each partition of the loaded database, the partition using one or more of the logs between the second checkpoint and the first checkpoint, the one or more logs being stored in the log storage area corresponding to the partition and being used in ascending order of the sequence numbers therein,
in the recovery of each partition, for a log that includes a corresponding sequence number which is a sequence number corresponding to the partition and one or more non-corresponding sequence numbers which are one or more sequence numbers other than the corresponding sequence number, the recovery executer is configured to perform update according to the log, for the partition and one or more other partitions respectively corresponding to the one or more non-corresponding sequence numbers, and
in the recovery of each partition, when the sequence number in the log corresponding to the partition is not a number next to a previously used sequence number in the log, the recovery executer is configured to wait for a log that includes the next number.

8. The database management system according to claim 1, wherein, for a second one of the transactions that updates only the first partition and belongs to the first-class transaction set, the generated log for the second one of the transactions includes a sequence number for the first partition and the log write request to write the generated log is issued only to the first log storage area, and
wherein, for a third one of the transactions that updates only the second partition and belongs to the first-class transaction set, the generated log for the third one of the transactions includes a sequence number for the second partition and the log write request to write the generated log is issued only to the second log storage area.

9. The database management system according to claim 8, further comprising:
an I/O (input/output) adapter coupled to the processor and configured to include at least a first I/O resource corresponding to the first partition and a second I/O resource corresponding to the second partition,
wherein the query executor is further configured to issue the generated log for the one of the transactions via the first I/O resource,
wherein the query executor is further configured to issue the generated log for the second one of the transactions via the first I/O resource, and wherein the query executor is further configured to issue the generated log for the third one of the transactions via the second I/O resource.

10. The database management system according to claim 1, wherein the query executor is configured not to record sequence numbers in the logs of the transactions belonging to a second-class transaction set which is a set of transactions of which results are not influenced by a transaction execution order and are different from the first-class transaction set.

11. The database management system according to claim 10, wherein the query executor is configured to determine whether each of the transactions belongs to the first transaction set or the second-class transaction set based on the information relating to the received query.

12. The database management system according to claim 11, wherein the memory stores the instructions that cause the processor to further execute:
a query execution plan generator configured to generate a query execution plan including information indicating one or more database operations necessary for executing the received query and an execution order of the one or more database operations based on the received query,
wherein the information relating to the received query is information indicating the query execution plan.

13. The database management system according to claim 1, wherein, for one of the transactions that updates both the first partition and the second partition and belongs to the first-class transaction set, the generated log for the one of the transactions includes the sequence number for the first partition and the sequence number for the second partition and the log write request to write the generated log is issued only to the first log storage area.

14. A computer system for managing a database that has a plurality of partitions including at least a first partition and a second partition, comprising:
an interface device coupled to a storage area which stores a plurality of log storage areas including at least a first log storage area corresponding to the first partition and a second log storage area corresponding to the second partition; and
a processor coupled to the interface device; and
a memory coupled to the processor and that stores instructions that cause the processor to execute a plurality of transactions on the plurality of partitions of the database, generate a log for each transaction during execution of the plurality of transactions, and store the generated logs in at least the first log storage area and the second log storage area, and
wherein the processor is further caused to sequentially record sequence numbers at least in the logs of the transactions belonging to a first-class set of transactions of which results are different depending on a transaction execution order, and
wherein the processor is further caused to sequentially record the sequence numbers in the logs of the transactions belonging to the first-class transaction set separately for the first partition and the second partition, and
wherein, for one of the transactions that updates both the first partition and the second partition and belongs to the first-class transaction set, the generated log for the one of the transactions includes a sequence number for the first partition and a sequence number for the second partition and the log write request to write the generated log is issued to the first log storage area and not to the second log storage area.

15. The computer system according to claim 14, wherein, for one of the transactions that updates both the first partition and the second partition and belongs to the first-class transaction set, the generated log for the one of the transactions includes the sequence number for the first partition and the sequence number for the second partition and the log write request to write the generated log is issued only to the first log storage area.

16. A database management system for managing a database that includes at least a first partition, a second partition, and a third partition, comprising:
a processor; and
a memory coupled to the processor and that stores instructions that cause the processor to execute:
a query receiver configured to receive a query on the database from a query issuer; and
a query executor configured to execute a plurality of transactions on the database based on information relating to the received query, generate a log for each transaction, and issue log write requests for writing the generated logs,
wherein the query executor is further configured to sequentially record sequence numbers in the logs of the transactions belonging to a first-class transaction set which is a set of transactions of which results are different depending on a transaction execution order, and
wherein the query executor is further configured to sequentially record the sequence numbers in the logs of the transactions belonging to the first-class transaction set separately for the first partition, the second partition, and the third partition, and
wherein, for one of the transactions that updates both the first partition and the second partition and belongs to the first-class transaction set, the generated log for the one of the transactions includes a sequence number for the first partition and a sequence number for the second partition and the log write request to write the generated log is issued to one of a first log storage area corresponding to the first partition and a second log storage area corresponding to the second partition, and
wherein, for one of the transactions that updates both the first partition and the third partition and belongs to the first-class transaction set, the generated log for the one of the transactions includes a sequence number for the first partition and a sequence number for the third partition and the log write request to write the generated log is issued to one of the first log storage area corresponding to the first partition and a third log storage area corresponding to the third partition.

17. The database management system according to claim 16, wherein, for one of the transactions that updates both the first partition and the second partition and belongs to the first-class transaction set, the generated log for the one of the transactions includes the sequence number for the first partition and the sequence number for the second partition and the log write request to write the generated log is issued only to the first log storage area, and
wherein, for one of the transactions that updates both the first partition and the third partition and belongs to the first-class transaction set, the generated log for the one of the transactions includes the sequence number for the first partition and the sequence number for the third partition and the log write request to write the generated log is issued only to the third log storage area.

18. The database management system according to claim 16, wherein, for one of the transactions that updates both the first partition and the second partition and belongs to the first-class transaction set, the generated log for the one of the transactions includes the sequence number for the first partition and the sequence number for the second partition and the log write request to write the generated log is issued only to the second log storage area, and wherein, for one of the transactions that updates both the first partition and the third partition and belongs to the first-class transaction set, the generated log for the one of the transactions includes the sequence number for the first partition and the sequence number for the third partition and the log write request to write the generated log is issued only to the third log storage area.

* * * * *